(12) United States Patent
Jurneke (10) Patent No.: US 11,367,459 B2
(45) Date of Patent: Jun. 21, 2022

(54) TOTAL DIMENSIONAL STABILITY COMPENSATION SYSTEM AND METHOD FOR MAGNETIC TAPE DRIVE

(71) Applicant: QUANTUM CORPORATION, San Jose, CA (US)

(72) Inventor: Joe K. Jurneke, Brighton, CO (US)

(73) Assignee: QUANTUM CORPORATION, San Jose, CA (US)

( * ) Notice: Subject to any disclaimer, the term of this patent is extended or adjusted under 35 U.S.C. 154(b) by 0 days.

(21) Appl. No.: 17/078,760

(22) Filed: Oct. 23, 2020

(65) Prior Publication Data

US 2021/0125633 A1 Apr. 29, 2021

Related U.S. Application Data

(60) Provisional application No. 62/927,001, filed on Oct. 28, 2019.

(51) Int. Cl.
*G11B 5/23* (2006.01)
*G11B 5/592* (2006.01)
*G11B 5/48* (2006.01)

(52) U.S. Cl.
CPC .......... *G11B 5/5928* (2013.01); *G11B 5/4893* (2013.01)

(58) Field of Classification Search
None
See application file for complete search history.

(56) References Cited

U.S. PATENT DOCUMENTS

| | | | | |
|---|---|---|---|---|
| 4,480,274 A * | 10/1984 | Coleman, Jr. | ........ | G11B 5/0086 360/18 |
| 4,539,615 A * | 9/1985 | Arai | ...................... | G11B 5/4893 360/121 |
| 5,117,322 A * | 5/1992 | Kaeriyama | ............ | G11B 15/61 360/130.24 |
| 5,307,217 A * | 4/1994 | Saliba | .................. | G11B 5/4893 360/121 |
| 5,371,638 A * | 12/1994 | Saliba | ................ | G11B 5/00817 360/121 |
| 5,523,904 A * | 6/1996 | Saliba | .................. | G11B 5/4893 360/77.12 |
| 5,680,278 A * | 10/1997 | Sawtelle, Jr. | .......... | G11B 21/00 360/261 |

(Continued)

*Primary Examiner* — Peter Vincent Agustin
(74) *Attorney, Agent, or Firm* — Roeder & Broder LLP; James P. Broder (57) ABSTRACT

A tape drive for use with a magnetic tape including two spaced apart servo tracks and a first data track includes a tape head, an actuator assembly, and a controller. The tape head includes two spaced apart servo elements that are each configured to read one of the two servo tracks, and a first read/write element that is configured to one of read data from and write data to the first data track. The tape head is positionable at a base head rotation angle relative to transverse to the length of the magnetic tape. The actuator assembly is configured to selectively rotate the tape head relative to the magnetic tape. The controller controls the actuator assembly to selectively rotate the tape head relative to the magnetic tape from the base head rotation angle to an adjusted head rotation angle that is different than the base head rotation angle based solely on servo information from the two servo elements reading the two servo tracks.

20 Claims, 4 Drawing Sheets

(56) References Cited

U.S. PATENT DOCUMENTS

| | | | | |
|---|---|---|---|---|
| 5,930,065 | A * | 7/1999 | Albrecht | G11B 5/584 360/72.2 |
| 6,088,184 | A * | 7/2000 | Hu | G11B 5/00817 360/69 |
| 6,141,174 | A * | 10/2000 | Judge | G11B 5/56 360/76 |
| 6,188,532 | B1 * | 2/2001 | Albrecht | G11B 5/00878 360/251.1 |
| 2008/0137235 | A1 * | 6/2008 | Biskeborn | G11B 5/584 360/317 |
| 2015/0043101 | A1 * | 2/2015 | Biskeborn | G11B 5/584 360/52 |
| 2021/0125633 | A1 * | 4/2021 | Jurneke | G11B 5/5928 |

* cited by examiner

TOTAL DIMENSIONAL STABILITY COMPENSATION SYSTEM AND METHOD FOR MAGNETIC TAPE DRIVE

RELATED APPLICATION

This application claims priority on U.S. Provisional Application Ser. No. 62/927,001, filed on Oct. 28, 2019, and entitled "IMPROVED MAGNETIC TAPE MEDIA CARTRIDGE". As far as permitted, the contents of U.S. Provisional Application Ser. No. 62/927,001 are incorporated in their entirety herein by reference.

BACKGROUND

Magnetic tape systems are configured for storing digital information, or data, on magnetic tape. Magnetic tape cartridges are configured to retain and/or store magnetic tape that can be used in a magnetic tape drive for purposes of reading data from and writing data to one or more data tracks on the magnetic tape. During use of the magnetic tape drive, a tape head assembly of the magnetic tape drive is configured to be in direct contact with the magnetic tape from the magnetic tape cartridge so that data can be written to and read from the magnetic tape as the magnetic tape moves across the tape head assembly at high speed.

In various applications, the magnetic tape utilizes a complex set of polymers containing a variety of materials exhibiting ferromagnetic properties. More particularly, a typical magnetic tape construct consists of a main substrate material, comprised of Poly Ethene Terephthalate (PET), Polyethylene Naphthalate (PEN), Poly Aramid (PA), PIBO, or a variety of other potential viscoelastic materials. Subsequently, various layers of materials are prepared and coated, evaporated, sputtered, or otherwise "placed" onto the main substrate. In such applications, the backside of the main substrate can get a special coating that aids in guiding, packing, and transporting the magnetic tape from one tape reel, e.g., a cartridge reel and/or a drive reel, to another tape reel. The front side, or "Mag Side", of the main substrate may receive multiple layers of materials, some of which may contain lubricants and non-magnetic particles. In addition, an active magnetic layer on the front side may consist of either deposited (e.g., coated, evaporated or sputtered) magnetic coatings, with or without a magnetic underlayer, or a coated magnetic layer consisting of particulate materials of many different types, such as MP particles ($Fe_2O_3$, or similar), Barium Ferrite, Iron Platinum, or other similar particle system.

A formatted magnetic tape of this type may include a set of two or more servo bands (or servo tracks) that are usable to properly locate the tape head assembly, and a set of recorded data tracks that may be written in parallel numbering from only one or two, up to potentially thousands. The data tracks are typically located between pairs of servo bands. Hence, a typical tape head assembly would consist of one or more servo readers, one or more data channels in parallel, and appropriate materials to support the active elements across the width of the magnetic tape.

It is desired to increase the amount of data that can be read from and/or written to any given magnetic tape. One way to increase the amount of data on a magnetic tape is to increase the areal density (product of linear density and track density) of the magnetic tape. One of the limiting factors to address the desire to achieve high or enhanced areal density is the sensitivity of the polymer stack (main substrate, backside coatings, front side coatings) that makes up the magnetic tape to environmental conditions such as temperature, dynamic temperature, humidity, tension, cartridge creep and/or aging. For example, the Coefficient of Thermal Expansion (CTE) impacts the width of the magnetic tape as a function of temperature. In particular, the CTE is typically positive with the magnetic tape expanding as the temperature increases. In a well-designed system, the designers strive to match the thermal expansion of the tape head assembly (approximately 7.8 ppm for AlTiC Construction (Aluminum Titanium Carbide)) to the media. As a "Steady State" condition, that can be achieved, however there are dynamic thermal changes that occur that upset that balance. Similarly, the Coefficient of Hygroscopic Expansion (CHE) causes the width of the magnetic tape to change in the presence of humidity. The CHE is typically positive as well with the magnetic tape expanding as the humidity increases, although such is not always the case. Additionally, the width of the magnetic tape also changes as a function of increasing or decreasing tension. The effects of tension are generally to change the width of tape as a function of increasing or decreasing tension. Further, as the magnetic tape ages over time, the tension in the magnetic tape within the magnetic tape cartridge tends to relax, resulting in changes from its recorded condition.

At high areal densities, the read and write trackwidths can be smaller than the dynamic changes due to Total Dimensional Stability (TDS) resulting from the effects of temperature, dynamic temperature, humidity, tension, cartridge creep and/or aging. When this happens, data written today may not be able to be read tomorrow.

One approach taken in the past is to limit the track density due to the need for narrow tracks, continually reduce the CHE, CTE, tension, and aging characteristics such that a reasonable level of performance can be achieved over environment, tension and time. However, as track densities increase, the effects become severe to the point the conventional approach cannot be successful.

Another approach is to reduce the read trackwidth to accommodate for the dimensional changes in the magnetic tape. However, as the track densities increase, the read trackwidths cannot always be reduced sufficiently to effectively accommodate such changes.

Accordingly, it is desired to find a more consistent and reliable system and method to compensate for TDS resulting from environmental conditions such as temperature, dynamic temperature, humidity, tension, cartridge creep and/or aging.

SUMMARY

The present invention is directed toward a tape drive for use with a magnetic tape including two spaced apart servo tracks and a first data track that are positioned along a length of the magnetic tape. In various embodiments, the tape drive includes a tape head, an actuator assembly, and a controller. The tape head includes two spaced apart servo elements that are each configured to read one of the two servo tracks, and a first read/write element that is configured to one of read data from and write data to the first data track. The tape head is positionable at a base head rotation angle relative to transverse to the length of the magnetic tape. The actuator assembly is configured to selectively rotate the tape head relative to the magnetic tape from the base head rotation angle to an adjusted head rotation angle that is different than the base head rotation angle. The controller controls the actuator assembly to selectively rotate the tape head relative to the magnetic tape from the base head rotation angle to the adjusted head rotation angle based solely on servo information from the two servo elements reading the two servo tracks.

In some embodiments, the base head rotation angle is between approximately one degree and 45 degrees relative to transverse to the length of the magnetic tape. In certain such embodiments, the base head rotation angle is between approximately five degrees and 15 degrees relative to transverse to the length of the magnetic tape.

In certain embodiments, the adjusted head rotation angle is between approximately zero degrees and 60 degrees relative to transverse to the length of the magnetic tape. In some such embodiments, the adjusted head rotation angle is between approximately zero degrees and 25 degrees relative to transverse to the length of the magnetic tape.

In some embodiments, the tape head includes a center of mass. In such embodiments, the actuator assembly can be configured to rotate the tape head relative to the magnetic tape about a pivot point that is positioned at the center of mass of the tape head.

In certain embodiments, the magnetic tape includes a plurality of data tracks that are positioned substantially between the two spaced apart servo tracks along the length of the magnetic tape. In such embodiments, the tape head includes a plurality of read/write elements that are each configured to one of read data from and write data to one of the plurality of data tracks. In some such embodiments, the two spaced apart servo tracks are spaced apart by a servo track spacing; and the base head rotation angle is controlled by the controller so that each of the two spaced apart servo elements are positioned to read one of the two spaced apart servo tracks that are spaced apart by the servo track spacing. Additionally, during use of the tape drive, changes in environmental conditions can cause a change in the servo track spacing to an adjusted servo track spacing. In such situations, the adjusted head rotation angle is controlled by the controller so that each of the two spaced apart servo elements are positioned to reduce the servo position error between the servo elements to zero such that each servo element can read one of the two spaced apart servo tracks that are spaced apart by the adjusted servo track spacing.

In some embodiments, the tape drive further includes a second tape head including two spaced apart second servo elements that are each configured to read one of the two servo tracks, and a second read/write element that is configured to one of read data from and write data to the first data track, the second tape head being positionable at a second base head rotation angle relative to transverse to the length of the magnetic tape; and a second actuator assembly that is configured to selectively rotate the second tape head relative to the magnetic tape from the second base head rotation angle to a second adjusted head rotation angle that is different than the second base head rotation angle. In such embodiments, the controller controls the second actuator assembly to selectively rotate the second tape head relative to the magnetic tape from the second base head rotation angle to the second adjusted head rotation angle based solely on servo information from the two second servo elements reading the two servo tracks. Additionally, in certain such embodiments, the second tape head includes a center of mass; and the second actuator assembly is configured to rotate the second tape head relative to the magnetic tape about a second pivot point that is positioned at the center of mass of the second tape head.

In some embodiments, the actuator assembly is further configured to move the tape head transversely relative to the magnetic tape.

The present invention is further directed toward a tape drive for use with a magnetic tape including two spaced apart servo tracks and a plurality of data tracks that are positioned substantially between the two servo tracks along a length of the magnetic tape, the tape drive including (A) a first tape head including two spaced apart first servo elements that are each configured to read one of the two servo tracks, and a plurality of first read/write elements that are configured such that each of the plurality of first read/write heads is positioned to one of read data from and write data to one of the plurality of data tracks, the first tape head being positionable at a first base head rotation angle relative to transverse to the length of the magnetic tape; (B) a first actuator assembly that is configured to selectively rotate the first tape head relative to the magnetic tape from the first base head rotation angle to a first adjusted head rotation angle that is different than the first base head rotation angle; (C) a second tape head including two spaced apart second servo elements that are each configured to read one of the two servo tracks, and a plurality of second read/write elements that are configured such that each of the plurality of second read/write heads is positioned to one of read data from and write data to one of the plurality of data tracks, the second tape head being positionable at a second base head rotation angle relative to transverse to the length of the magnetic tape; (D) a second actuator assembly that is configured to selectively rotate the second tape head relative to the magnetic tape from the second base head rotation angle to a second adjusted head rotation angle that is different than the second base head rotation angle; and (E) a controller that controls the first actuator assembly to selectively rotate the first tape head relative to the magnetic tape from the first base head rotation angle to the first adjusted head rotation angle based solely on servo information from the two first servo elements reading the two servo tracks.

Additionally, in certain implementations, the present invention is also directed toward a tape drive for use with a magnetic tape including two spaced apart servo tracks that are spaced apart by a servo track spacing and a plurality of data tracks that are positioned substantially between the two servo tracks along a length of the magnetic tape, the tape drive including (A) a tape head including two spaced apart servo elements that are each configured to read one of the two servo tracks, and a plurality of read/write elements that are configured such that each of the plurality of read/write heads is positioned to one of read data from and write data to one of the plurality of data tracks, the tape head being positionable at a base head rotation angle of between approximately one degree and 45 degrees relative to transverse to the length of the magnetic tape; (B) an actuator assembly that is configured to selectively rotate the tape head relative to the magnetic tape from the base head rotation angle to an adjusted head rotation angle that is different than the base head rotation angle, the adjusted head rotation angle being between approximately zero degrees and 60 degrees relative to transverse to the length of the magnetic tape; and (C) a controller that controls the actuator assembly to selectively rotate the tape head relative to the magnetic tape from the base head rotation angle to the adjusted head rotation angle based solely on servo information from the two servo elements reading the two servo tracks; wherein the base head rotation angle is controlled by the controller so that each of the two spaced apart servo elements are positioned to read one of the two spaced apart servo tracks that are spaced apart by the servo track spacing; wherein changes in environment conditions cause a change in the servo track spacing to an adjusted servo track spacing; and wherein the adjusted head rotation angle is controlled by the controller so that each of the two spaced apart servo elements are positioned to read one of the two spaced apart servo tracks that are spaced apart by the adjusted servo track spacing.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

While embodiments of the present invention are susceptible to various modifications and alternative forms, specifics thereof have been shown by way of example and drawings, and are described in detail herein. It is understood, however, that the scope herein is not limited to the particular embodiments described. On the contrary, the intention is to cover modifications, equivalents, and alternatives falling within the spirit and scope herein.

DESCRIPTION

Embodiments of the present invention are described herein in the context of a total dimension stability (TDS) compensation system and method for a magnetic tape drive that controls a position and/or orientation of a tape head assembly such that read/write elements of the tape head assembly can more accurately read data from and/or write data to one or more data tracks on a magnetic tape. More particularly, during use of a magnetic tape system, the position and/or orientation of the tape head assembly of the magnetic tape drive can be selectively adjusted and controlled to compensate for changes in environmental conditions that may impact the width of the magnetic tape and the position and/or spacing of servo tracks on the magnetic tape. Thus, the TDS compensation system and method is able to compensate for changes in position and/or spacing of the one or more data tracks on the magnetic tape due to changes in environmental conditions such as temperature, dynamic temperature, humidity, tension, cartridge creep and/or aging.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it is appreciated that such a development effort might be complex and time-consuming, but would nevertheless be a routine undertaking of engineering for those of ordinary skill in the art having the benefit of this disclosure.

Figure 1:
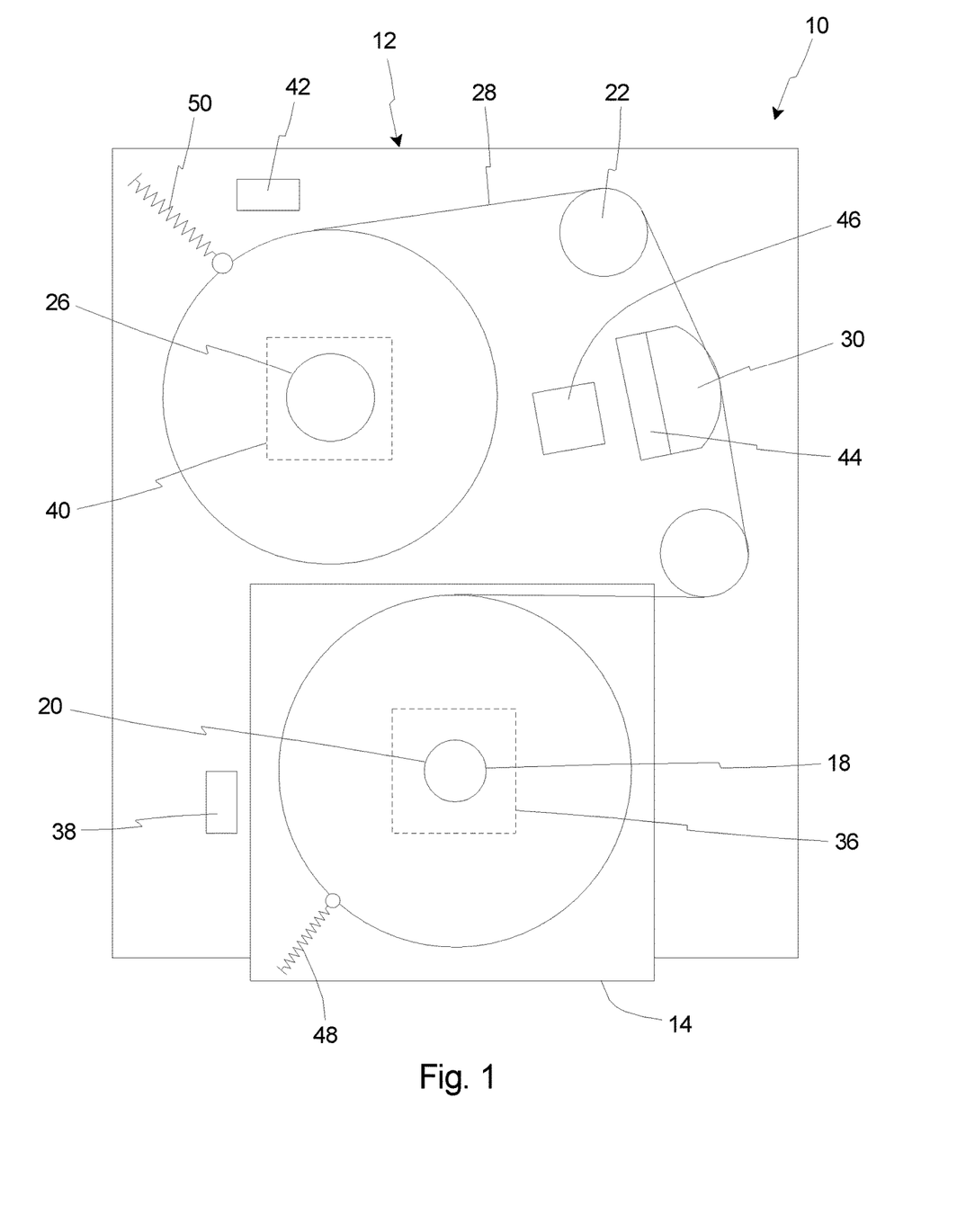
FIG. 1 is a simplified schematic top view illustration of a magnetic tape system including an embodiment of a magnetic tape drive having features of the present invention, and a magnetic tape cartridge that has been inserted into the magnetic tape drive.

FIG. 1 is a simplified schematic top view illustration of a magnetic tape system 10 (also referred to herein simply as a "tape system") including an embodiment of a magnetic tape drive 12 (also referred to herein simply as a "tape drive") having features of the present invention, and a magnetic tape cartridge 14 (also referred to herein simply as a "tape cartridge") that has been inserted into the tape drive 12. It is appreciated that in many aspects the tape drive 12 as shown in FIG. 1 represents a generic tape drive, and in such aspects is shown by way of example and not by way of limitation. In some embodiments, the tape drive 12 operates in compliance with an LTO specification, such as LTO-6, LTO-7, LTO-8 or LTO-9. Stated in another manner, in such embodiments, the tape cartridge 14 is an LTO-compatible tape cartridge. However, it is appreciated that the technology described herein can be applied to any serpentine-style embodiment.

During use of the tape system 10, the tape cartridge 14 is inserted into the tape drive 12 to read data from and/or write data to a magnetic tape 16 that is retained within the tape cartridge 14. As shown, the tape cartridge 14 includes a cartridge reel 18 that includes and/or defines a cartridge hub 20. The magnetic tape 16 is spooled about the cartridge hub 20 of the cartridge reel 18. In certain embodiments, the magnetic tape 16 can include at least one servo track 222 (illustrated in FIG. 2) and a plurality of data tracks 224 (illustrated in FIG. 2) that run along a longitudinal length of the magnetic tape 16. In one such embodiment, the magnetic tape 16 can include two servo tracks 222 that are positioned near opposing outer edges of the magnetic tape 16 along a length of the magnetic tape 16, and the plurality of data tracks 224 can be positioned along the magnetic tape 16 substantially between the two servo tracks 222. Additionally, in such embodiments, each of the servo tracks 222 and data tracks 224 can be positioned substantially parallel to each other.

Figure 2:
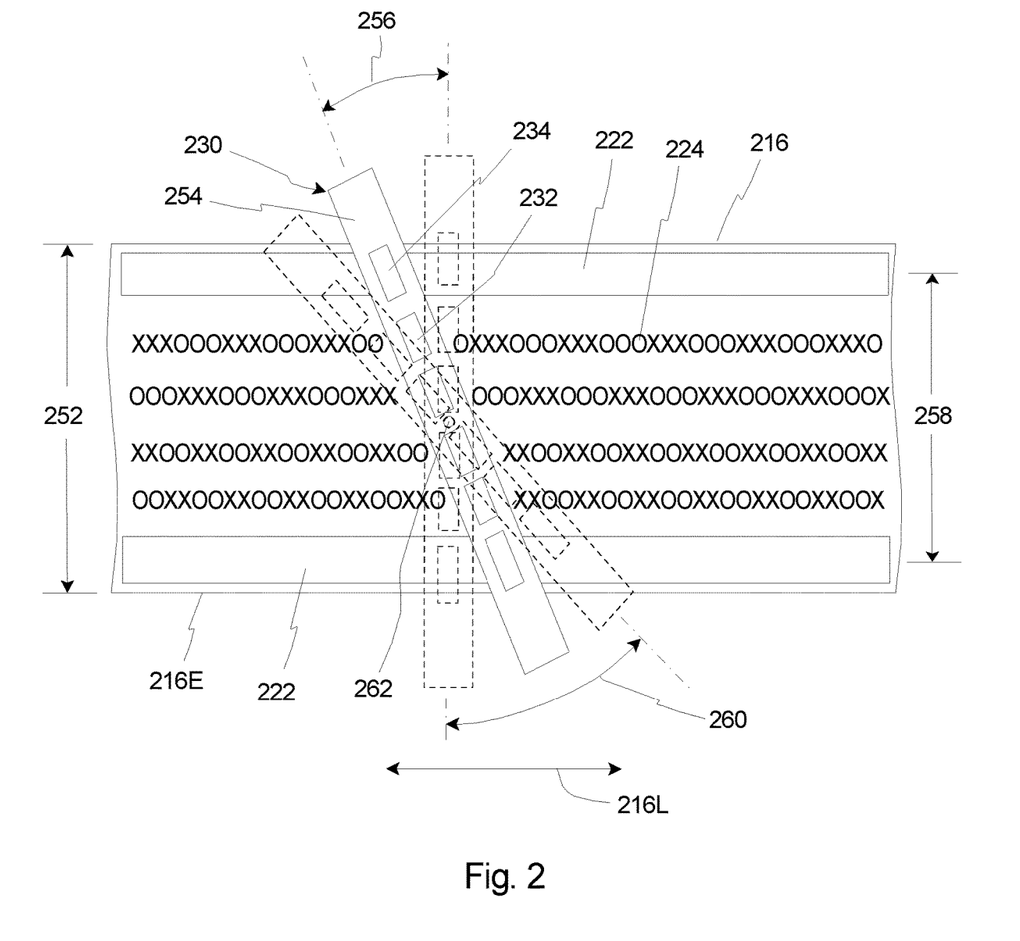
FIG. 2 is a simplified schematic illustration of a portion of a magnetic tape that can be retained within the magnetic tape cartridge, and an embodiment of a tape head assembly having features of the present invention that can form part of the magnetic tape drive for purposes of reading data from and writing data to the magnetic tape.

It is appreciated that the at least one servo track 222, which can include any suitable or desired number of servo tracks without limitation, can also be referred to as a "first servo track", a "second servo track", etc. Additionally, it is further appreciated that the plurality of data tracks 224, which can include any suitable or desired number of data tracks without limitation, can also be referred to as a "first data track", a "second data track", etc.

The tape cartridge 14 supplies the magnetic tape 16 to the tape drive 12. More particularly, when the tape cartridge 14 is inserted into the tape drive 12, one end of the magnetic tape 16 is taken up within the tape drive 12 to be wrapped around a drive reel 26 included in the tape drive 12. The magnetic tape 16 traverses a predefined path between the cartridge reel 18 and the drive reel 26, which is defined, a least in part, by one or more rollers 28 (two are shown in FIG. 1) positioned at strategic positions along the predefined path. The rollers 28 may also aid in limiting gross lateral movement (i.e. in and out of the page as shown in FIG. 1) of the magnetic tape 16, i.e. lateral tape motion or "LTM".

Along the predefined path, the drive reel 26 moves the magnetic tape 16 across a tape head assembly 30 (also sometimes referred to herein simply as a "head assembly"). In certain embodiments, the head assembly 30 includes a plurality of read/write elements 232 (illustrated in FIG. 2) that are configured to read data from and/or write data to the magnetic tape 16. In particular, the head assembly 30 is positioned in close proximity to the predefined path of the magnetic tape 16 such that as the magnetic tape 16 travels in the longitudinal direction (by being wound from the cartridge reel 18 to the drive reel 26 or vice versa) the head assembly 30 and/or the read/write elements 232 can read data from and/or write data to a particular data track 224 at a longitudinal position of the magnetic tape 16. Additionally, in some embodiments, the head assembly 30 can include one or more servo elements 234 (illustrated in FIG. 2) configured to read the servo track(s) 222 of the magnetic tape 16. The servo elements 234 reading of the servo tracks 222 is utilized to ensure the proper positioning of the head assembly 30 relative to the magnetic tape 16, e.g., so that the read/write elements 232 can be properly and accurately aligned with the data tracks 224.

In alternative embodiments, it is appreciated that the head assembly 30 can include one or more individual tape heads (or "bumps"), with each tape head including one or more servo elements 234 (and preferably at least two servo elements 234), and at least one read/write element 232 (and preferably a plurality of read/write elements 232). In one non-exclusive such embodiment, the head assembly 30 can include a single tape head that includes a pair of servo elements 234 and a plurality of read/write elements 232 that are positioned substantially between the servo elements 234. Alternatively, in another embodiment, the head assembly 30 can include more than one tape head. For example, in certain such alternative embodiments, the head assembly 30 can include two, three, four or five individual tape heads. Further, in certain such alternative embodiments, in addition to each individual tape head including at least one, and preferably two servo elements 234, such individual tape heads can be dedicated for purposes of either reading data from the data tracks 224 on the magnetic tape 16 (i.e. as a read head including only read elements and no write elements), or writing data to the data tracks 224 on the magnetic tape 16 (i.e. as a write head including only write elements and no read elements). Still alternatively, each individual tape head can include both read elements and write elements.

It is appreciated that the one or more servo elements 234 can also be referred to as a "first servo element", a "second servo element", etc. Additionally, it is further appreciated that the at least one read/write element 232 can also be referred to as a "first read/write element", a "second read/write element", etc.

In some embodiments, as shown, the tape drive 12 can also include a cartridge reel motor 36 (illustrated as a box in phantom) that generates the necessary force to rotate the cartridge reel 18 at will, and a cartridge reel encoder 38, e.g., a sensor or detector, that is configured to output signals representing the pulse rate (or rotation rate) of the cartridge reel motor 36. Additionally, the tape drive 12 can further include a drive reel motor 40 (illustrated as a box in phantom) that generates the necessary force to rotate the drive reel 26 at will, and a drive reel encoder 42, e.g., a sensor or detector, that is configured to output signals representing the pulse rate (or rotation rate) of the drive reel motor 40.

As an overview, as illustrated in this embodiment, the tape drive 12 further includes an actuator assembly 44 including one or more actuators, and a controller 46, including one or more processors and circuits, that can be communicatively coupled to the head assembly 30. In various embodiments, and as described in greater detail herein below, the actuator assembly 44 is configured to move the head assembly 30 under control of the controller 46 in order to control a transverse position and/or a rotational position of the head assembly 30 relative to the magnetic tape 16 based on a signal provided by the controller 46. As such, the actuator assembly 44 comprises a mechanical positioner to move the head assembly 30 up or down transversely and/or rotationally relative to the magnetic tape 16 so that the head assembly 30 is best positioned to enable the read/write elements 232 to accurately read data from and/or write data to particular data tracks 224. More particularly, the actuator assembly 44 is configured to move the head assembly 30 under control of the controller 46 based on servo information feedback regarding the positions of the servo elements 234 relative to the servo tracks 222. Subsequently, the actuator assembly 44 moves the head assembly 30 transversely and/or rotationally so that the servo elements 234 are accurately aligned with the servo tracks 222, and thus the read/write elements 232 can be accurately aligned with the data tracks 224. Thus, by controlling the transverse and/or rotational position of the head assembly 30 relative to the magnetic tape 16, a particular data track 224 of the magnetic tape 16 can be accessed by a corresponding read/write element 232 as desired. It is appreciated that in certain embodiments, the actuator assembly 44 can include separate actuators for purposes of moving the head assembly 30 transversely relative to the magnetic tape 16 and for purposes of moving the head assembly 30 rotationally relative to the magnetic tape 16.

Additionally, it is appreciated that the relative positions of the servo tracks 222 and the data tracks 224, and/or a spacing between the tracks 222, 224 can be impacted by various environmental conditions to which the magnetic tape 16 may be subjected during the life of the magnetic tape 16. More specifically, environmental conditions such as temperature, dynamic temperature, humidity, tension, cartridge creep and/or aging can impact a width of the magnetic tape 16, and thus impact the relative positions of and/or spacing between the tracks 222, 224. Accordingly, as such environmental conditions cause dynamic changes to the positions and spacing of the tracks 222, 224 along the magnetic tape 16 due to Total Dimensional Stability (TDS), the controller 46 can receive feedback based on servo information, i.e. the accuracy of the positions of the servo elements 234 relative to the servo tracks 222, and use such feedback to control the actuator assembly 44 to move and/or position the head assembly 30 as desired.

In embodiments of the head assembly 30 that include more than one individual head, a separate actuator assembly 44 and controller 46 can be provided for each individual head, or the head assembly 30 can utilize a single actuator assembly 44 to selectively move one or more heads and/or a single controller 46 to selectively control one or more heads.

It is appreciated that the actuator assembly 44 can have any suitable design for purposes of moving the head assembly 30 as necessary to ensure that the read/write elements 232 can be accurately aligned with the data tracks 224 such that data can be effectively read from and/or written to the data tracks 224 on the magnetic tape 16. For example, in certain embodiments, the actuator assembly 44 can include a piezoelectric actuator, a micro electro-mechanical systems (MEMS) actuator, a servo tilt actuator, and/or another suitable type of actuator.

It is further appreciated that, in addition to the controller 46 being in communication with the actuator assembly 44, the controller 46 can also be in communication with a number of other components within the tape drive 12. For example, although not specifically shown in FIG. 1, each of the cartridge reel motor 36, the cartridge reel encoder 38, the drive reel motor 40, and the drive reel encoder 42 can be in communication with the controller 46. As such, the controller 46 can be configured to perform various specified operations, either individually, or in combination with other software, hardware and/or firmware elements.

FIG. 1 also illustrates that, in some embodiments, the tape cartridge 14 further includes a cartridge reel alignment assembly 48 for the magnetic tape 16 such that the magnetic tape 16 is kept in a desired lateral position (i.e. with limited lateral movement) as it is wound (and unwound) around the cartridge hub 20. Thus, the cartridge reel alignment assembly 48 can be helpful for higher track density applications. It is appreciated that in certain embodiments, the cartridge reel alignment assembly 48 can also be configured to minimize air entrainment that may otherwise occur during the winding and unwinding of the magnetic tape 16 around the cartridge hub 16.

Additionally, in some embodiments, as shown in FIG. 1, the tape drive 12 can also be modified to include a drive reel alignment assembly 50 for the magnetic tape 16 such that the magnetic tape 16 is kept in a desired lateral position as it is wound (and unwound) around the drive reel 26. It is appreciated that in certain embodiments, the drive reel alignment assembly 50 can also be configured to minimize air entrainment that may otherwise occur during the winding and unwinding of the magnetic tape 16 around the drive reel 26. It is further appreciated that the general design and functioning of the drive reel alignment assembly 50 can be substantially similar to that of the cartridge reel alignment assembly 48.

FIG. 2 is a simplified schematic illustration of a portion of a magnetic tape 216 that can be retained within the magnetic tape cartridge 14 (illustrated in FIG. 1), and an embodiment of a tape head assembly 230 having features of the present invention that can form part of the magnetic tape drive 12 (illustrated in FIG. 1) for purposes of reading data from and writing data to the magnetic tape 216.

As illustrated, the magnetic tape 216 includes one or more servo tracks 222 and one or more data tracks 224 (illustrated with a series of "X"s and "O"s). In one embodiment, as shown, the magnetic tape 216 includes two spaced apart servo tracks 222 that are positioned near opposing lateral tape edges 216E of the magnetic tape 216. However, it is appreciated that the magnetic tape 216 can include any suitable number of servo tracks 222, and the servo tracks 222 can be positioned in any suitable manner relative to a tape width 252 of the magnetic tape 216. More particularly, in alternative embodiments, the magnetic tape 216 can include greater than two servo tracks 222 or only a single servo track 222.

It is further appreciated that the magnetic tape 216 can include any suitable number of data tracks 224. More particularly, although FIG. 2 illustrates the magnetic tape 216 as including four data tracks 224, this is merely for purposes of simplicity and ease of illustration, and it is appreciated that the magnetic tape 216 can alternatively include greater than four data tracks 224 or fewer than four data tracks 224. For example, in various alternative embodiments, the magnetic tape 216 can include only one data track 224 up to potentially thousands of data tracks 224. In one such non-exclusive alternative embodiment, the magnetic tape 216 can be configured to include 32 individual data tracks 224.

Additionally, as shown, in certain embodiments, the data tracks 224 can be positioned substantially between the servo tracks 222 along a tape length 216L (or longitudinal direction, shown as a two-headed arrow) of the magnetic tape 216. Moreover, as illustrated in FIG. 2, the data tracks 224 can be spaced apart and substantially parallel to each other and the servo tracks 222.

The head assembly 230 can include any desired number of tape heads 254. In the embodiment shown in FIG. 2, the head assembly 230 includes one tape head 254. Alternatively, the head assembly 230 can include greater than one tape head 254. For example, in certain non-exclusive alternative embodiments, the head assembly 230 can include two, three, four or five individual tape heads 254.

As illustrated in this embodiment, the tape head 254 and/or the head assembly 230 includes one or more servo elements 234 that are utilized to read the servo track(s) 222 to ensure the proper positioning of the head assembly 230 relative to the magnetic tape 216, and one or more read/write elements 232. In one embodiment, as shown, the tape head 254 includes two spaced apart servo elements 234 that are positioned near opposing ends, e.g., near a top and a bottom, of the tape head 254. Alternatively, the tape head 254 can include greater than two servo elements 234 or only a single servo element 234. Still alternatively, the servo elements 234 can be positioned in a different manner than is shown in FIG. 2. It is appreciated that the servo elements 234 are positioned in a manner to effectively correspond with the servo tracks 222 on the magnetic tape 216.

The tape head 254 can include any suitable number of read/write elements 232 that are configured to read data from and/or write data to the data tracks 224 on the magnetic tape 216. More particularly, although FIG. 2 illustrates the tape head 254 as including four read/write elements 232, it is appreciated that the tape head 254 can alternatively include greater than four read/write elements 232 or fewer than four read/write elements 232. In one such non-exclusive alternative embodiment, the tape head 254 can be configured to include 32 individual read/write elements 232. It is appreciated that the number of read/write elements 232 will typically be the same as the number of data tracks 224 on the magnetic tape 216, such that each read/write element 232 is configured to read data from and/or write data to one of the data tracks 224.

It is appreciated that the ability of the read/write elements 232 to effectively read data from and/or write data to the data tracks 224 is dependent on the proper and accurate positioning of the read/write elements 232 relative to the data tracks 224. This is determined based on the proper positioning of the servo elements 234 relative to the servo tracks 222. As noted above, changes in environmental conditions can cause corresponding changes to the tape width 252 of the magnetic tape 216. For example, certain changes in environmental conditions can increase the tape width 252 of the magnetic tape 216, thereby moving the servo tracks 222 farther apart. Similarly, in such situations, the data tracks 224 are moved farther apart as well. Without the ability to adapt to such environmental changes, as in previous tape drives, if the change in environment is too severe, the data tracks 224 become unreadable. Worse than that, damage can occur to previously written data tracks 224 if new data tracks 224 are written next to the old data tracks 224 under a radically different environment. Moreover, as track densities increase, the read and write trackwidths of the data tracks 224 are reduced significantly. This makes the data tracks 224 more sensitive to the environment. Fundamentally, if the tape head 254 is positioned perpendicular to the tape edges 216E of the magnetic tape 216, as is done in most traditional tape drives, nothing can be done to compensate for any environmental conditions that increase the tape width 252 of the magnetic tape 216.

Importantly, in various embodiments illustrated and described herein, in order to enable the tape head 254 to adapt to potential changes in tape width 252 due to changes in environmental conditions such as temperature, dynamic temperature, humidity, tension, cartridge creep and/or aging, as shown, the tape head 254 can be initially oriented at a base head rotation angle 256 (illustrated with the tape head 254 shown in solid lines) relative to transverse (or perpendicular) to the length 216L (or longitudinal direction) of the magnetic tape 216. In certain non-excusive alternative embodiments, the tape head 254 can be initially oriented with a base head rotation angle 256 of greater than zero degrees, such as between approximately one degree and 45 degrees relative to transverse to the length 216L of the magnetic tape 216. More particularly, in some such embodiments, the tape head 254 can be initially oriented with a base head rotation angle 256 of between approximately two degrees and 45 degrees, five degrees and 40 degrees, five degrees and 35 degrees, five degrees and 30 degrees, five degrees and 25 degrees, five degrees and 20 degrees, five degrees and 15 degrees, or five degrees and ten degrees relative to transverse to the length 216L of the magnetic tape 216. It is appreciated that the base head rotation angle 256 should be set such that the one or more servo elements 234 are initially effectively aligned with the one or more servo tracks 222 on the magnetic tape 216, and the one or more read/write elements 232 are effectively aligned with the one or more data tracks 224 on the magnetic tape 216, prior to and/or at the start of use of the tape system 10 (illustrated in FIG. 1). Alternatively, in another embodiment, the tape head 254 can be initially oriented with another suitable base head rotation angle 256 relative to transverse to the length 216L of the magnetic tape 216. It is further appreciated that in certain embodiments, the tape head 254 can be initially oriented with the base head rotation angle 256 equal to zero degrees relative to transverse to the length 216L of the magnetic tape 216, but such initial orientation may impact the ability of the tape system 10 (illustrated in FIG. 1) to effectively react to certain changes in environmental conditions and/or certain changes in dimension of the magnetic tape 216.

During use of the tape system 10, as noted, the magnetic tape 216 will be subjected to potential changes in environmental conditions, e.g., changes in one or more of temperature, dynamic temperature, humidity, tension, cartridge creep and/or aging, which can impact the tape width 252 of the magnetic tape 216. Additionally, it is appreciated that any such changes to the tape width 252 of the magnetic tape 216 will cause corresponding changes to a servo track spacing 258 between the servo tracks 222 on the magnetic tape 216, i.e. the servo tracks 222 will move from the servo track spacing 258 to an adjusted servo track spacing. For example, increases in temperature and/or humidity will typically cause an increase in the tape width 252 of the magnetic tape 216, and thus an increase in the servo track spacing 258 to the adjusted servo track spacing between the servo tracks 222 on the magnetic tape 216. Additionally, the effects of tension are generally to reduce the tape width 252 of the magnetic tape 216, and thus reduce the servo track spacing 258 to the adjusted servo track spacing between the servo tracks 222 on the magnetic tape 216, as a function of increasing tension.

In order to determine the changes in servo track spacing 258 between the servo tracks 222 on the magnetic tape 216 over time, any potential position error of the servo elements 234 relative to the servo tracks 222 can be determined at any time. In particular, the amount of compensation (or change) can be determined by averaging the position error of each of the servo elements 234 to zero by tilting or rotating the tape head 254 relative to the base head rotation angle 256. Stated in another manner, if the tape width 252 of the magnetic tape 216 changes due to any environmental conditions such as temperature, dynamic temperature, humidity, tension, cartridge creep and/or aging, the rotation and/or orientation (or tilt) of the tape head 254 relative to transverse to the length 216L of the magnetic tape 216 can be independently servoed to compensate for any such changes. Thus, the actuator assembly 44, under control of the controller 46, can move the head assembly 230 and/or the tape head 254 rotationally so that the servo elements 234 are again accurately aligned with the servo tracks 222, and thus the read/write elements 232 can again be accurately aligned with the data tracks 224. As such, in various embodiments, the controller 46 is used to control the actuator assembly 44 to control a rotational position of the head assembly 230 and/or the tape head 254 relative to the magnetic tape 216 based solely on servo information feedback.

More specifically, if it is determined that the tape width 252 of the magnetic tape 216, and thus the servo track spacing 258 between the servo tracks 222 on the magnetic tape 216, has increased, then the controller 46 (illustrated in FIG. 1) can control the actuator assembly 44 (illustrated in FIG. 1) to rotate the tape head 254 so that the tape head 254 is oriented at an adjusted head rotation angle 260 (illustrated with the tape head 254 shown in dashed lines) relative to transverse to the length 216L of the magnetic tape 216 that is different than, i.e. less than, the base head rotation angle 256. Additionally or in the alternative, if it is determined that the tape width 252 of the magnetic tape 216, and thus the servo track spacing 258 between the servo tracks 222 on the magnetic tape 216, has decreased, then the controller 46 can control the actuator assembly 44 to rotate the tape head 254 so that the tape head 254 is oriented at an adjusted head rotation angle 260 relative to transverse to the length 216L of the magnetic tape 216 that is different than, i.e. greater than, the base head rotation angle 256. Thus, it is appreciated that the adjusted head rotation angle 260 relative to transverse to the length 216L of the magnetic tape 216, as adjusted based on feedback from servo information due to changes in environmental conditions, can be greater than or less than the base head rotation angle 256. For example, in certain non-exclusive alternative embodiments, the adjusted head rotation angle 260 can be between approximately zero degrees and 60 degrees relative to transverse to the length 216L of the magnetic tape 216. More particularly, in some such embodiments, the tape head 254 can be adjusted rotationally to an adjusted head rotation angle 260 of between approximately zero degrees and 25 degrees relative to transverse to the length 216L of the magnetic tape 216. Alternatively, the tape head 254 can be adjusted rotationally to an adjusted head rotation angle 260 of another suitable angle relative to transverse to the length 216L of the magnetic tape 216.

Additionally, in various embodiments, the tape head 254 is movable and/or rotatable with the actuator assembly 44 relative to the magnetic tape 216 by between approximately one degree and 45 degrees from the base head rotation angle 256 to the adjusted head rotation angle 260. More particularly, in certain such non-exclusive embodiments, the tape head 254 is movable and/or rotatable with the actuator assembly 44 by at least approximately one degree, two degrees, three degrees, five degrees, seven degrees, ten degrees, 12 degrees, 15 degrees, 20 degrees, 25 degrees, 30 degrees, 35 degrees, 40 degrees, or 45 degrees from the base head rotation angle 256 to the adjusted head rotation angle 260. Alternatively, the tape head 254 is movable and/or rotatable with the actuator assembly 44 by another suitable number of degrees from the base head rotation angle 256 to the adjusted head rotation angle 260.

In certain embodiments, as illustrated herein, the tape head 254 can be configured to rotate about a center of mass of the tape head 254. More particularly, in this embodiment, the tape head 254 can be rotated by the actuator assembly 44, under control of the controller 46, about a pivot point 262 that is positioned at the center of mass of the tape head 254. Alternatively, in other embodiments, the tape head 254 can be configured to rotate about other portions of the tape head 254. For example, in certain such embodiments, the tape head 254 can be configured to rotate about a centerline of one of the servo elements 234, e.g., either the top servo element 234 or the bottom servo element 234 shown in FIG. 2.

It is appreciated that by positioning and rotating the tape head 254 as described, the need for adjacent track write elements and read elements is no longer a necessity for future high areal density systems. The key limiting factor to achieving high areal density performance is significant increases in track density. With the embodiments illustrated and described herein, dimensional stability is no longer a consideration, and expensive substrate materials are no longer required. More particularly, any substrate material can be used for multi-track recording that suffers from dimensional stability concerns. Furthermore, a width of the read/write elements 232 no longer has to be severely limited to accommodate environmental conditions, thereby allowing the width of the read/write elements 232 to be approximately equal to track pitch of the data tracks 224.

It is further appreciated that the layout of the read/write elements 232 and the servo elements 234 on the tape head 254 changes slightly due to the rotation and/or positioning of the tape head 254 relative to the magnetic tape 216. In particular, the distance or spacing between the read/write elements 232 and the servo elements 234 can increase slightly due to the required compensation for TDS in situations where changes in environmental conditions cause increases in the tape width 252 of the magnetic tape 216. As an example, assume the servo track spacing 258 is typically approximately 3000 microns. In addition, assume that the worst-case TDS over all environments, due to noted environmental changes is 2 microns. Thus, the maximum new servo element spacing would be the 3000 microns+2 microns due to compensation for TDS. The read/write elements 232 would be spread apart similarly. As an example, assume the track spacing would normally be 43 microns. Further assume that the tape head 254 includes 32 read/write elements 232 (any number greater than one is acceptable). The distance the read/write elements 232 would be spread apart would be the normal 43 microns+2 microns/32. However, it is appreciated that the spacing between servo elements 234 and the spacing between read/write elements 232 need not be based solely only the potential compensation for TDS. Rather, such spacing can be larger if desired. In fact, tilt servo gain would increase for larger spacing distances.

Figure 3A:
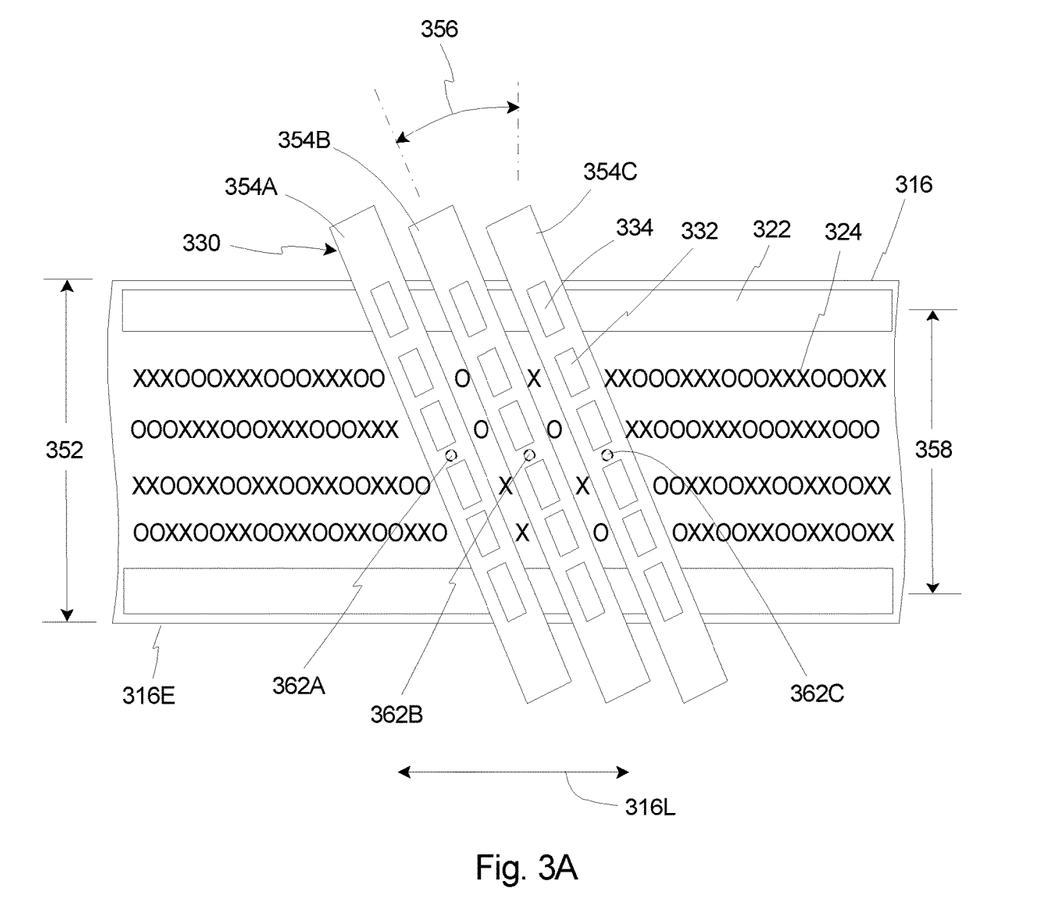
FIG. 3A is a simplified schematic illustration of a portion of the magnetic tape, and another embodiment of the tape head assembly including a plurality of tape heads being shown in a first position.

FIG. 3A is a simplified schematic illustration of a portion of the magnetic tape 316, and another embodiment of the tape head assembly 330 that can form part of the magnetic tape drive 12 (illustrated in FIG. 1) for purposes of reading data from and/or writing data to the magnetic tape 316.

The magnetic tape 316 can be substantially similar to the magnetic tape illustrated and described herein above. For example, the magnetic tape 316 again includes one or more servo tracks 322 (and again preferably at least two servo tracks 322) and one or more data tracks 324 (illustrated with a series of "X"s and "O"s). More particularly, in one embodiment, the magnetic tape 316 again includes two spaced apart servo tracks 322 that can be positioned near opposing lateral tape edges 316E of the magnetic tape 316. Additionally, the magnetic tape 316 again includes any suitable number of data tracks 324. Although FIG. 3A illustrates the magnetic tape 316 as including four data tracks 324, this is merely for purposes of simplicity and ease of illustration, and it is appreciated that the magnetic tape 316 can alternatively include greater than four data tracks 324 or fewer than four data tracks 324. Further, as shown, in certain embodiments, the data tracks 324 can again be positioned substantially between the servo tracks 322, and can be spaced apart and substantially parallel to each other and the servo tracks 322.

As shown in FIG. 3A, in this embodiment, the head assembly 330 is somewhat different than in the previous embodiments. More specifically, in the embodiment illustrated in FIG. 3A, the head assembly 330 includes three individual tape heads (or bumps), i.e. a first tape head 354A, a second tape head 354B, and a third tape head 354C. Similar to the previous embodiments, each tape head 354A, 354B, 354C can include one or more servo elements 334 (and preferably at least two servo elements 334), and at least one read/write element 332 (and preferably a plurality of read/write elements 332). In one non-exclusive such embodiment, each tape head 354A, 354B, 354C includes a pair of servo elements 334 that are utilized to read the servo track(s) 322 to ensure the proper positioning of the head assembly 330 relative to the magnetic tape 316, and a plurality of read/write elements 332 that are positioned substantially between the servo elements 334. Additionally, in some embodiments, each individual tape head 354A, 354B, 354C can be dedicated for purposes of either reading data from the data tracks 324 on the magnetic tape 316 (i.e. as a read head including only read elements and no write elements), or writing data to the data tracks 324 on the magnetic tape 316 (i.e. as a write head including only write elements and no read elements). Alternatively, each individual tape head 354A, 354B, 354C can include both read elements and write elements. Still alternatively, one or more of the individual tape heads 354A, 354B, 354C can be designed without any servo elements, and the servo elements 334 of any one tape head 354A, 354B, 354C can be utilized in the process of collectively controlling the position and/or orientation of more than one tape head 354A, 354B, 354C.

Each tape head 354A, 354B, 354C can include any suitable number of read/write elements 332 that are configured to read data from and/or write data to the data tracks 324 on the magnetic tape 316. More particularly, although FIG. 3A illustrates each tape head 354A, 354B, 354C as including four read/write elements 332, it is appreciated that each tape head 354A, 354B, 354C can alternatively include greater than four read/write elements 332 or fewer than four read/write elements 332. It is appreciated that the number of read/write elements 332 for each tape head 354A, 354B, 354C will typically be the same as the number of data tracks 324 on the magnetic tape 316, such that each read/write element 332 is configured to read data from and/or write data to one of the data tracks 324.

The ability of the read/write elements 332 to effectively read data from and/or write data to the data tracks 324 is dependent on the proper and accurate positioning of the read/write elements 332 relative to the data tracks 324. This is again determined based on the proper positioning of the servo elements 334 relative to the servo tracks 322. In this embodiment, it is again appreciated that the relative positions of the servo tracks 322 and the data tracks 324, and/or a spacing between the tracks 322, 324 can be impacted by various environmental conditions, i.e. temperature, dynamic temperature, humidity, tension, cartridge creep and/or aging, to which the magnetic tape 316 may be subjected during the life of the magnetic tape 316. More specifically, environmental conditions such as temperature, dynamic temperature, humidity, tension, cartridge creep and/or aging can impact a tape width 352 of the magnetic tape 316, and thus impact the relative positions of and/or spacing between the tracks 322, 324. Accordingly, as such environmental conditions cause dynamic changes to the positions and spacing of the tracks 322, 324 along the magnetic tape 316 due to Total Dimensional Stability (TDS), the controller 46 (illustrated in FIG. 1) can again receive feedback based on servo information, i.e. the accuracy of the positions of the servo elements 334 relative to the servo tracks 322, and use such servo information feedback to control the actuator assembly 44 (illustrated in FIG. 1) to position the individual tape heads 354A, 354B, 354C and/or the head assembly 330 as desired. In one embodiment, a separate actuator assembly 44 and/or a separate controller 46 can be included for each of the individual tape heads 354A, 354B, 354C. With such design, the position and/or orientation of each individual tape head 354A, 354B, 354C can be controlled independently of each of the other tape heads 354A, 354B, 354C. Alternatively, in other embodiments, a single actuator assembly 44 and/or a single controller 46 can be utilized to control the position and/or orientation of more than one tape head 354A, 354B, 354C.

FIG. 3A further illustrates each of the tape heads 354A, 354B, 354C in a first position. In particular, in order to enable the tape heads 354A, 354B, 354C to adapt to potential changes in tape width 352 due to changes in environmental conditions such as temperature, dynamic temperature, humidity, tension, cartridge creep and/or aging, FIG. 3A illustrates each of the tape heads 354A, 354B, 354C being initially oriented at a base head rotation angle 356 relative to transverse to the length 316L (or longitudinal direction, illustrated as a two-headed arrow) of the magnetic tape 316. In certain non-excusive alternative embodiments, the tape heads 354A, 354B, 354C can be initially oriented with a base head rotation angle 356 of between approximately one degree and 45 degrees relative to transverse to the length 316L of the magnetic tape 316. More particularly, in some such embodiments, the tape heads 354A, 354B, 354C can be initially oriented with a base head rotation angle 356 of between approximately five degrees and 45 degrees, five degrees and 40 degrees, five degrees and 35 degrees, five degrees and 30 degrees, five degrees and 25 degrees, five degrees and 20 degrees, five degrees and 15 degrees, or five degrees and ten degrees relative to transverse to the length 316L of the magnetic tape 316. It is appreciated that the base head rotation angle 356 for each of the tape heads 354A, 354B, 354C should be set such that the one or more servo elements 334 are initially effectively aligned with the one or more servo tracks 322 on the magnetic tape 316, and the one or more read/write elements 332 are effectively aligned with the one or more data tracks 324 on the magnetic tape 316, prior to and/or at the start of use of the tape system 10 (illustrated in FIG. 1).

It is appreciated that any changes to the tape width 352 of the magnetic tape 316, i.e. to an adjusted tape width 352A (illustrated in FIG. 3B), will again cause corresponding changes to a servo track spacing 358, i.e. to an adjusted servo track spacing 358A (illustrated in FIG. 3B), between the servo tracks 322 on the magnetic tape 316. In order to determine the changes in servo track spacing 358 between the servo tracks 322 on the magnetic tape 316 over time, any potential position error of the servo elements 334 relative to the servo tracks 322 can be determined at any time. In particular, the amount of compensation (or change) can again be determined by averaging the position error of each of the servo elements 334 to zero by tilting or rotating the tape head 354A, 354B, 354C relative to the base head rotation angle 356. Stated in another manner, if the tape width 352 of the magnetic tape 316 changes due to any environmental conditions such as temperature, dynamic temperature, humidity, tension, cartridge creep and/or aging, the rotation and/or orientation (or tilt) of each tape head 354A, 354B, 354C relative to transverse to the length 316L of the magnetic tape 316 can be independently servoed to compensate for any such changes. Thus, the actuator assembly 44 for each tape head 354A, 354B, 354C, under control of the controller 46 for each tape head 354A, 354B, 354C, can move the tape heads 354A, 354B, 354C rotationally so that the servo elements 334 are again accurately aligned with the servo tracks 322, and thus the read/write elements 332 can again be accurately aligned with the data tracks 324. As such, in various embodiments, the controller 46 is used to control the actuator assembly 44 to control a rotational position of each tape head 354A, 354B, 354C of the head assembly 330 relative to the magnetic tape 316 based solely on servo information feedback.

Figure 3B:
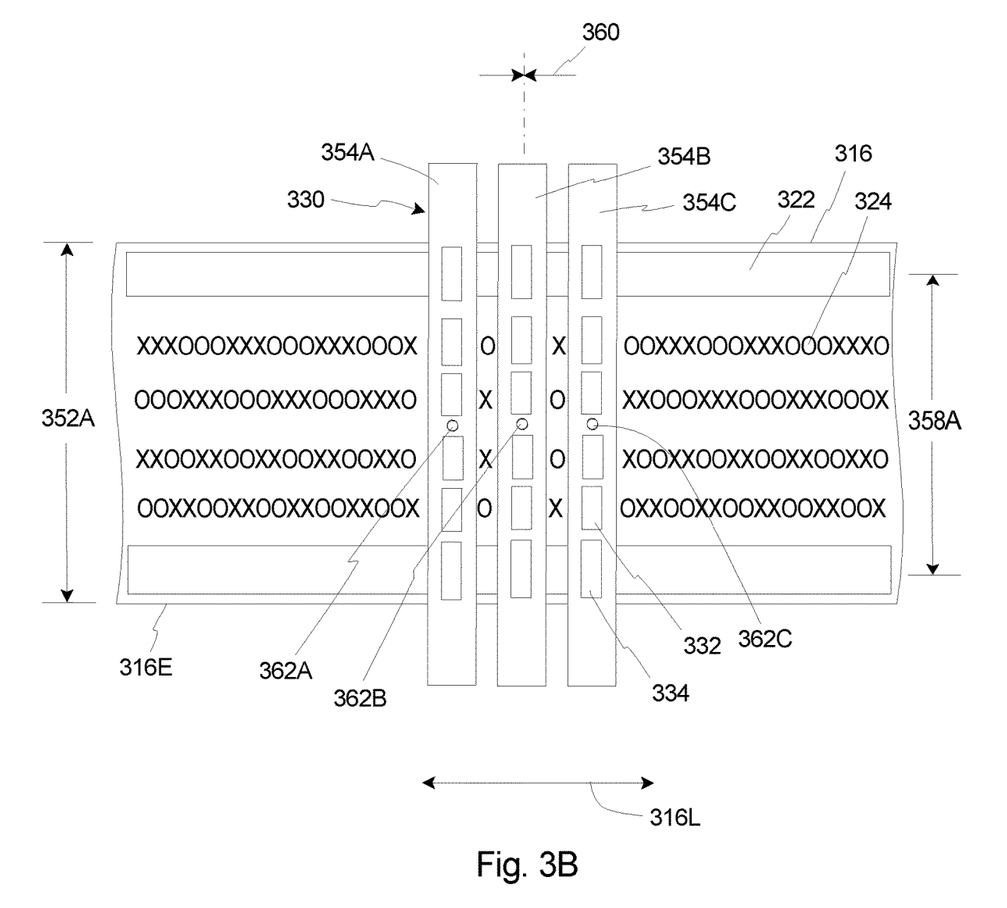
FIG. 3B is a simplified schematic illustration of the portion of the magnetic tape and the tape head assembly illustrated in FIG. 3A, the plurality of tape heads being shown in a second position.

More specifically, if it is determined that the tape width 352 of the magnetic tape 216, and thus the servo track spacing 358 between the servo tracks 322 on the magnetic tape 316, has increased (i.e. such that the magnetic tape 316 now has the adjusted tape width 352A, and the servo tracks 322 are spaced apart by the adjusted servo track spacing 358A), then the controller 46 can control the actuator assembly 44 associated with each tape head 354A, 354B, 354C to rotate such tape head 354A, 354B, 354C so that the tape head 354A, 354B, 354C is oriented at an adjusted head rotation angle 360 relative to transverse to the length 316L of the magnetic tape 316 that is different than, i.e. less than, the base head rotation angle 356. Such a situation is illustrated in FIG. 3B. In particular, FIG. 3B is a simplified schematic illustration of the portion of the magnetic tape 316 and the tape head assembly 330 illustrated in FIG. 3A, with the plurality of tape heads 354A, 354B, 354C being shown in a second position, i.e. with each tape head 354A, 354B, 354C having been reoriented to the adjusted head rotation angle 360 relative to transverse to the length 316L of the magnetic tape 316. In the particular implementation illustrated in FIG. 3B, the adjusted head rotation angle 360 is approximately zero degrees, with the tape heads 354A, 354B, 354C being oriented transverse (or perpendicular) to the length 316L of the magnetic tape 316. However, it is appreciated that the adjusted head rotation angle 360 can be other than zero degrees relative to transverse to the length 316L of the magnetic tape 316.

Additionally or in the alternative, if it is determined that the tape width 352 of the magnetic tape 316, and thus the servo track spacing 358 between the servo tracks 322 on the magnetic tape 316, has decreased (i.e. such that the magnetic tape 316 now has the adjusted tape width 352A, and the servo tracks 322 are spaced apart by the adjusted servo track spacing 358A), then the controller 46 can control the actuator assembly 44 for each individual tape head 354A, 354B, 354C to rotate such tape heads 354A, 354B, 354C so that the tape head 354A, 354B, 354C is oriented at an adjusted head rotation angle relative to transverse to the length 316L of the magnetic tape 316 that is different than, i.e. greater than, the base head rotation angle 356.

Thus, it is appreciated that the adjusted head rotation angle 360 for each tape head 354A, 354B, 354C relative to transverse to the length 316L of the magnetic tape 316, as adjusted based on feedback from servo information due to changes in environmental conditions, can be greater than or less than the base head rotation angle 356. For example, in certain non-exclusive alternative embodiments, the adjusted head rotation angle 360 for each tape head 354A, 354B, 354C can be between approximately zero degrees and 60 degrees relative to transverse to the length 316L of the magnetic tape 316. More particularly, in some such embodiments, each tape head 354A, 354B, 354C can be adjusted rotationally to an adjusted head rotation angle 360 of between approximately zero degrees and 25 degrees relative to transverse to the length 316L of the magnetic tape 316.

Additionally, in various embodiments, each tape head 354A, 354B, 354C is movable and/or rotatable with the actuator assembly 44 relative to the magnetic tape 316 by between approximately one degree and 45 degrees from the base head rotation angle 356 to the adjusted head rotation angle 360. More particularly, in certain such non-exclusive embodiments, each tape head 354A, 354B, 354C is movable and/or rotatable with the actuator assembly 44 by at least approximately one degree, two degrees, three degrees, five degrees, seven degrees, ten degrees, 12 degrees, 15 degrees, 20 degrees, 25 degrees, 30 degrees, 35 degrees, 40 degrees, or 45 degrees from the base head rotation angle 356 to the adjusted head rotation angle 360.

It is appreciated that based on the particular designs of each individual tape head 354A, 354B, 354C, each tape head 354A, 354B, 354C need not be oriented to the same adjusted head rotation angle 360 in order to effectively align the servo elements 334 of such tape heads 354A, 354B, 354C to the servo tracks 322 on the magnetic tape 316. However, in various applications, if the design of each of the tape heads 354A, 354B, 354C is substantially similar, then each tape head 354A, 354B, 354C will typically be oriented at the same adjusted head rotation angle 360 in order to effectively align the servo elements 334 of such tape heads 354A, 354B, 354C to the servo tracks 322 on the magnetic tape 316.

In certain embodiments, as illustrated herein, each tape head 354A, 354B, 354C can be configured to rotate about a center of mass of such tape head 354A, 354B, 354C. More particularly, in this embodiment, each tape head 354A, 354B, 354C can be rotated by a respective actuator assembly 44, under control of a respective controller 46, about a pivot point 362A, 3628, 362C that is positioned at the center of mass of such tape head 354A, 354B, 354C. Alternatively, in other embodiments, each tape head 354A, 354B, 354C can be configured to rotate about other portions of such tape head 354A, 354B, 354C. For example, in certain such embodiments, each tape head 354A, 354B, 354C can be configured to rotate about a centerline of one of the servo elements 334, e.g., either the top servo element 334 or the bottom servo element 334 of such tape head 354A, 354B, 354C. Still alternatively, in one embodiment, the tape heads 354A, 354B, 354C can be configured to rotate collectively about a single pivot point, e.g., at a center of mass of the head assembly 330 in its entirety, which may coincide with a center of mass of a centrally positioned tape head.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

It is understood that although a number of different embodiments of the magnetic tape drive 12 and/or the tape head assembly 30 have been illustrated and described herein, one or more features of any one embodiment can be combined with one or more features of one or more of the other embodiments, provided that such combination satisfies the intent of the present invention.

While a number of exemplary aspects and embodiments of the magnetic tape drive 12 and/or the tape head assembly 30 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A tape drive for use with a magnetic tape including two spaced apart servo tracks and a first data track that is positioned substantially between the two servo tracks along a length of the magnetic tape, the tape drive comprising:
 a first tape head including two spaced apart first servo elements that are each configured to read one of the two servo tracks, and a first read element that is configured to read data from the first data track, the first tape head being positionable at a first base head rotation angle relative to transverse to the length of the magnetic tape;
 a first actuator assembly that is configured to selectively rotate the first tape head relative to the magnetic tape from the first base head rotation angle to a first adjusted head rotation angle that is different than the first base head rotation angle;
- a second tape head including two spaced apart second servo elements that are each configured to read one of the two servo tracks, and a first write element that is configured to write data to the first data track, the second tape head being positionable at a second base head rotation angle relative to transverse to the length of the magnetic tape;
- a second actuator assembly that is configured to selectively rotate the second tape head relative to the magnetic tape from the second base head rotation angle to a second adjusted head rotation angle that is different than the second base head rotation angle; and
- a controller that (i) controls the first actuator assembly to selectively rotate the first tape head relative to the magnetic tape from the first base head rotation angle to the first adjusted head rotation angle based solely on servo information from the two first servo elements reading the two servo tracks; and (ii) controls the second actuator assembly to selectively rotate the second tape head relative to the magnetic tape from the second base head rotation angle to the second adjusted head rotation angle based solely on servo information from the two second servo elements reading the two servo tracks, the controller controlling the second actuator assembly independently of the first actuator assembly.

2. The tape drive of claim 1 wherein the controller (i) controls the first actuator assembly to selectively rotate the first tape head relative to the magnetic tape from the first base head rotation angle to the first adjusted head rotation angle based solely on timing-based servo information from the two first servo elements reading the two servo tracks; and (ii) controls the second actuator assembly to selectively rotate the second tape head relative to the magnetic tape from the second base head rotation angle to the second adjusted head rotation angle based solely on timing-based servo information from the two second servo elements reading the two servo tracks.

3. The tape drive of claim 1 wherein the magnetic tape includes a plurality of data tracks that are positioned substantially between the two spaced apart servo tracks along the length of the magnetic tape; wherein the first tape head includes a plurality of read elements that are each configured to read data from one of the plurality of data tracks; and wherein the second tape head includes a plurality of write elements that are each configured to write data to one of the plurality of data tracks.

4. The tape drive of claim 1 wherein at least one of the first base head rotation angle and the second base head rotation angle is between approximately one degree and 45 degrees relative to transverse to the length of the magnetic tape.

5. The tape drive of claim 4 wherein at least one of the first adjusted head rotation angle and the second adjusted head rotation angle is between approximately zero degrees and 60 degrees relative to transverse to the length of the magnetic tape.

6. The tape drive of claim 1 wherein at least one of the first base head rotation angle and the second base head rotation angle is between approximately five degrees and 15 degrees relative to transverse to the length of the magnetic tape.

7. The tape drive of claim 6 wherein at least one of the first adjusted head rotation angle and the second adjusted head rotation angle is between approximately zero degrees and 25 degrees relative to transverse to the length of the magnetic tape.

8. The tape drive of claim 1 wherein the two spaced apart servo tracks are spaced apart by a servo track spacing; wherein the first base head rotation angle is controlled by the controller so that each of the two spaced apart first servo elements are positioned to read one of the two spaced apart servo tracks that are spaced apart by the servo track spacing; and wherein the second base head rotation angle is controlled by the controller so that each of the two spaced apart second servo elements are positioned to read one of the two spaced apart servo tracks that are spaced apart by the servo track spacing.

9. The tape drive of claim 8 wherein changes in environmental conditions cause a change in the servo track spacing to an adjusted servo track spacing; wherein the first adjusted head rotation angle is controlled by the controller so that each of the two spaced apart first servo elements are positioned to read one of the two spaced apart servo tracks that are spaced apart by the adjusted servo track spacing; and wherein the second adjusted head rotation angle is controlled by the controller so that each of the two spaced apart second servo elements are positioned to read one of the two spaced apart servo tracks that are spaced apart by the adjusted servo track spacing.

10. The tape drive of claim 1 wherein the first tape head includes a center of mass; and wherein the first actuator assembly is configured to rotate the first tape head relative to the magnetic tape about a first pivot point that is positioned at the center of mass of the first tape head.

11. The tape drive of claim 1 wherein the second tape head includes a center of mass; and wherein the second actuator assembly is configured to rotate the second tape head relative to the magnetic tape about a second pivot point that is positioned at the center of mass of the second tape head.

12. The tape drive of claim 1 wherein the first actuator assembly is further configured to move the first tape head transversely relative to the magnetic tape; and wherein the second actuator assembly is further configured to move the second tape head transversely relative to the magnetic tape.

13. A tape drive for use with a magnetic tape including two spaced apart servo tracks and a first data track that are positioned along a length of the magnetic tape, the tape drive comprising:
- a tape head assembly including (i) at least two servo elements that are each configured to read one of the two servo tracks, (ii) a read element that is configured to read data from the first data track, the read element being positionable at a first base rotation angle relative to transverse to the length of the magnetic tape, and (iii) a write element that is configured to write data to the first data track, the write element being positionable at a second base rotation angle relative to transverse to the length of the magnetic tape;
- an actuator assembly that is configured to (i) selectively rotate the read element relative to the magnetic tape from the first base rotation angle to a first adjusted rotation angle that is different than the first base rotation angle, and (ii) selectively rotate the write element relative to the magnetic tape from the second base rotation angle to a second adjusted rotation angle that is different than the second base rotation angle; and
- a controller that controls the actuator assembly to selectively and independently (i) rotate the read element relative to the magnetic tape from the first base rotation angle to the first adjusted rotation angle based solely on servo information from the at least two servo elements reading the two servo tracks, and (ii) rotate the write element relative to the magnetic tape from the second base rotation angle to the second adjusted rotation angle based solely on servo information from the at least two servo elements reading the two servo tracks.

14. The tape drive of claim 13 wherein the controller controls the actuator assembly to selectively and independently (i) rotate the read element relative to the magnetic tape from the first base rotation angle to the first adjusted rotation angle based solely on timing-based servo information from the at least two servo elements reading the two servo tracks, and (ii) rotate the write element relative to the magnetic tape from the second base rotation angle to the second adjusted rotation angle based solely on timing-based servo information from the at least two servo elements reading the two servo tracks.

15. The tape drive of claim 13 wherein the magnetic tape includes a plurality of data tracks that are positioned substantially between the two spaced apart servo tracks along the length of the magnetic tape; and wherein the tape head assembly includes a plurality of read elements that are each configured to read data from one of the plurality of data tracks, and a plurality of write elements that are each configured to write data to one of the plurality of data tracks.

16. The tape drive of claim 13 wherein the tape head assembly includes (i) a first tape head including two spaced apart first servo elements that are each configured to read one of the two servo tracks, and the read element that is configured to read data from the first data track; and (ii) a second tape head including two spaced apart second servo elements that are each configured to read one of the two servo tracks, and the write element that is configured to write data to the first data track.

17. The tape drive of claim 13 wherein at least one of the first base rotation angle and the second base rotation angle is between approximately one degree and 45 degrees relative to transverse to the length of the magnetic tape.

18. The tape drive of claim 17 wherein at least one of the first adjusted rotation angle and the second adjusted rotation angle is between approximately zero degrees and 60 degrees relative to transverse to the length of the magnetic tape.

19. The tape drive of claim 13 wherein the tape head assembly includes a center of mass; and wherein the actuator assembly is configured to rotate the tape head assembly relative to the magnetic tape about a pivot point that is positioned at the center of mass of the tape head assembly.

20. The tape drive of claim 13 wherein the actuator assembly is further configured to move the tape head assembly transversely relative to the magnetic tape.

* * * * *